US009856837B2

(12) United States Patent
Dunn et al.

(10) Patent No.: US 9,856,837 B2
(45) Date of Patent: Jan. 2, 2018

(54) APPARATUS AND METHOD FOR FUELLING A FLEXIBLE-FUEL INTERNAL COMBUSTION ENGINE

(71) Applicant: Westport Power Inc., Vancouver (CA)

(72) Inventors: Mark E. Dunn, Vancouver (CA); John M. Lapetz, Northville, MI (US); Alan B. Welch, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 670 days.

(21) Appl. No.: 14/272,469

(22) Filed: May 7, 2014

(65) Prior Publication Data

US 2014/0238340 A1 Aug. 28, 2014

Related U.S. Application Data

(63) Continuation of application No. PCT/CA2012/050830, filed on Nov. 20, 2012.
(Continued)

(51) Int. Cl.
*F02M 43/04* (2006.01)
*F02M 43/00* (2006.01)
(Continued)

(52) U.S. Cl.
CPC ........... *F02M 43/04* (2013.01); *F02D 19/061* (2013.01); *F02D 19/0613* (2013.01);
(Continued)

(58) Field of Classification Search
CPC ............... F02D 19/061; F02D 19/0613; F02D 19/0615; F02D 19/0642; F02D 19/0647;
(Continued)

(56) References Cited

U.S. PATENT DOCUMENTS 5,941,210 A * 8/1999 Hill ..................... F02B 43/00
123/298
6,947,830 B1 9/2005 Froloff et al.
(Continued)

FOREIGN PATENT DOCUMENTS

CN 101131126 2/2008
CN 101975108 2/2011
(Continued)

OTHER PUBLICATIONS

Search Report issued by SIPO dated Feb. 14, 2016 in connection with co-pending China Application No. 201280067662.x.
(Continued)

*Primary Examiner* — Erick Solis
*Assistant Examiner* — Anthony L Bacon
(74) *Attorney, Agent, or Firm* — Carie C. Mager; C. Larry Kyle

(57) ABSTRACT

A flexible-fuel internal combustion engine apparatus comprises a combustion chamber, an intake valve, a first fuel injector, a second fuel injector, and a computer. The intake valve is operable to admit an intake charge into the combustion chamber. The first fuel injector injects a gaseous fuel directly into the combustion chamber. The second fuel injector injects a liquid fuel into the intake charge upstream of the intake valve. The computer is operatively connected with the first fuel injector and the second fuel injector to actuate injection of fuel respectively therefrom. The computer is programmed to command a gaseous-to-liquid fuel ratio as a function of at least one operating parameter from a group comprising gaseous fuel pressure, gaseous fuel mass, engine speed, engine torque, inlet air temperature, inlet air humidity, knock detection, operating history, torque command, and emissions.

68 Claims, 4 Drawing Sheets

Related U.S. Application Data

(60) Provisional application No. 61/562,754, filed on Nov. 22, 2011.

(51) Int. Cl.
   *F02D 35/02* (2006.01)
   *F02D 41/00* (2006.01)
   *F02D 19/10* (2006.01)
   *F02D 41/30* (2006.01)
   *F02D 19/06* (2006.01)
   *F02D 19/08* (2006.01)

(52) U.S. Cl.
   CPC ..... *F02D 19/0615* (2013.01); *F02D 19/0628* (2013.01); *F02D 19/0642* (2013.01); *F02D 19/081* (2013.01); *F02D 19/10* (2013.01); *F02D 35/027* (2013.01); *F02D 41/0025* (2013.01); *F02D 41/3029* (2013.01); *F02M 43/00* (2013.01); *F02D 41/0027* (2013.01); *Y02T 10/36* (2013.01)

(58) Field of Classification Search
   CPC ............. F02D 19/0663; F02D 19/0678; F02D 41/0025; F02D 41/0027; F02D 2700/0202
   See application file for complete search history.

(56) References Cited

U.S. PATENT DOCUMENTS

| | | | |
|---|---|---|---|
| 7,228,841 B2 | 6/2007 | Takemoto et al. | |
| 7,310,576 B1* | 12/2007 | Letang | F02D 41/042 |
| | | | 701/112 |
| 7,627,416 B2 | 12/2009 | Batenburg et al. | |
| 7,703,435 B2* | 4/2010 | Surnilla | F02D 19/0628 |
| | | | 123/27 GE |
| 7,770,560 B2 | 8/2010 | Ulrey et al. | |
| 7,832,381 B2 | 11/2010 | Pott et al. | |
| 7,894,973 B2 | 2/2011 | Mallebrein et al. | |
| 2002/0185086 A1* | 12/2002 | Newman | F02D 19/0647 |
| | | | 123/1 A |
| 2006/0102145 A1 | 5/2006 | Cohn et al. | |
| 2007/0157912 A1 | 7/2007 | Ritter et al. | |
| 2007/0169464 A1* | 7/2007 | Saito | F02D 41/1494 |
| | | | 60/276 |
| 2009/0070008 A1 | 3/2009 | Batenburg et al. | |
| 2009/0277432 A1 | 11/2009 | Hung et al. | |
| 2009/0292444 A1 | 11/2009 | Russell | |
| 2010/0318284 A1 | 12/2010 | Surnilla et al. | |
| 2011/0017174 A1 | 1/2011 | Ulrey et al. | |
| 2011/0088654 A1 | 4/2011 | Courtoy et al. | |
| 2011/0088657 A1 | 4/2011 | Tanno et al. | |
| 2011/0132323 A1* | 6/2011 | Surnilla | F02D 19/0644 |
| | | | 123/406.19 |
| 2011/0162620 A1 | 7/2011 | Bidner et al. | |
| 2013/0255646 A1* | 10/2013 | Ulrey | F02D 41/0027 |
| | | | 123/527 |

FOREIGN PATENT DOCUMENTS

| | | |
|---|---|---|
| DE | 102006056573 A1 | 5/2007 |
| EP | 2009277 A1 | 12/2008 |
| WO | 2006079173 A1 | 8/2006 |

OTHER PUBLICATIONS

International Search Report and Written Opinion of the International Searching Authority dated Feb. 18, 2013, in connection with International Application No. PCT/CA2012/050830.

International Preliminary Report on Patentability and Written Opinion of the International Bureau dated May 27, 2014 in connection with PCT/CA2012/050830.

Search Report dated Jul. 30, 2015 in co-pending European application.

* cited by examiner

APPARATUS AND METHOD FOR FUELLING A FLEXIBLE-FUEL INTERNAL COMBUSTION ENGINE

CROSS-REFERENCE TO RELATED APPLICATIONS

This application is a continuation of International Application No. PCT/CA2012/050830 having an international filing date of Nov. 20, 2012 entitled "Method And Apparatus For Pumping Fuel To A Fuel Injection System". The '830 international application claimed priority benefits, in turn, from U.S. Provisional Patent Application Ser. No. 61/562,754 filed on Nov. 22, 2011. The '830 international application is hereby incorporated by reference herein in its entirety.

FIELD OF THE INVENTION

The present application relates to internal combustion engines and, in particular, to an apparatus and method for fuelling a flexible-fuel engine.

BACKGROUND OF THE INVENTION

Bi-fuel vehicles fuelled with a liquid fuel, such as gasoline or ethanol, as one fuel, and alternatively with a gaseous fuel, such as compressed natural gas (CNG) or liquefied petroleum gas (LPG), historically have had limited penetration into the consumer automobile market. More recently, growing market demand has led automobile original equipment manufacturers (OEMs) to invest more in developing bi-fuel vehicles as a product. Two major reasons influencing this trend include commodity prices and emissions standards.

Decisions for automobile purchases are directly affected by the relationship between the prices of crude oil versus natural gas. Manufacturers of automobiles are responsive to these decisions and accordingly are indirectly influenced by this relationship. That is, fuel costs influence how consumers will invest in automobiles that consume natural gas or fuels derived from crude oil, such as gasoline and diesel. Historically, the prices of crude oil and natural gas generally maintained a 10-to-1 relationship, so that one barrel of crude oil was priced at roughly 10 times one million British thermal units of natural gas. Energy parity is approximately a 6-to-1 ratio, implying that other barriers, such as infrastructure logistics, must be factored into the equation even though energy derived from crude is more expensive than natural gas. More recently, this relationship has increased by about 100% to a 20-to-1 ratio. Suddenly, consumers are more willing to consider alternative fuel vehicles, for example so called bi-fuel, dual fuel or multi-fuel type vehicles, in large part because of the much higher fuel costs associated with gasoline or diesel.

A dual fuel engine is defined herein to be an engine that can be fuelled with two different fuels at the same time, whereas a bi-fuel engine is defined herein to be an engine that can be fuelled with either one fuel or another fuel, and a flexible-fuel engine is defined herein to be an engine that operates either as a bi-fuel or a dual fuel engine. There is a need for a new and improved apparatus and method for delivering fuel to a combustion chamber of a flexible-fuel engine.

Emissions standards are regulatory requirements that set specific limits to the amount of pollutants that can be released into the environment from the operation of a motor vehicle. These standards specifically restrict emissions of carbon monoxide (CO), oxides of nitrogen ($NO_x$), particulate matter (PM), formaldehyde (HCHO), and non-methane organic gases (NMOG) or non-methane hydrocarbons (NMHC). The limits are typically defined in grams per kilometer (g/km). Since the introduction of catalytic converters and the corresponding phase-out of leaded gasoline in most of the world, great improvements have been made towards reducing pollution derived from automobiles. Over time, and with technology advances, emissions standards become increasingly more stringent. For example, in the United States an automobile manufacturer's combined fuel economy for their entire fleet must now meet average targets, and more recently these targets include greenhouse gas emissions. In order to meet new regulatory requirements improvements were sought in engine control system technologies and in the catalytic converters that reduce harmful by-products from combustion of liquid fuels. However, as standards for emissions are continually becoming more stringent, manufacturers are finding it more difficult to meet these standards with catalytic converters alone, or with changes to well established engine control systems.

Natural gas is the cleanest of all the broadly available fossil fuels. The main products of the combustion of natural gas are carbon dioxide and water vapor. Gasoline is composed of more complex molecules, with a higher carbon ratio and higher nitrogen and sulfur contents. As gasoline is combusted there are higher levels of carbon emissions, nitrogen oxides ($NO_x$), sulfur dioxide ($SO_2$) and particulate matter (soot) compared to the by-products of natural gas combustion.

Improvements in emissions are obtained if a vehicle is fuelled at least some of the time with natural gas. Automobile manufacturers are now considering alternative fuel vehicles, and especially bi-fuel vehicles fuelled with natural gas as one fuel or gasoline as another fuel, as a means for meeting current and future emissions standards, as emission reductions achieved by catalytic converters are approaching the current paradigm limit and further improvements in such converters are more difficult to obtain. The present-day fuelling infrastructure for natural gas is not as well developed as that for gasoline and diesel, so bi-fuel vehicles allow operation in areas where an operator might be at risk of running out of fuel if natural gas were the only fuel the vehicle could use.

After-market bi-fuel vehicles have been in use for some time. Conventionally, standard gasoline vehicles are retrofitted in specialized shops, which involve installing compressed natural gas (CNG) cylinders in the trunk to serve as fuel tanks and the installation of an injection system and electronics on the engine. The performance and emissions of these vehicles are less than optimal due to a limited cooperation between the original engine system and the after-market system. Gasoline vehicles converted to run on natural gas suffer a performance penalty due to the low compression ratio of the gasoline engines, resulting in a reduction of delivered power (10%-15%) while running on natural gas. Such bi-fuel vehicles are optimized to operate with gasoline and are typically less efficient when fuelled with natural gas.

After market dual-fuel vehicles conventionally employed a fumigation conversion kit or an injection conversion kit. Prior to on board vehicle computers, for example on-board diagnostics (OBD) systems, fumigation conversion kits were used with a mixer and a regulator for non-injection systems. With the introduction of fuel injection and on board diagnostics into standard vehicles, conversion kits evolved into port injection techniques that interoperate, though in a limited fashion, with the original vehicle manufacturers' fuelling strategy and sensor system checks. Again, both conversion techniques were sub-optimal solutions due to limited cooperation between the original engine system and the conversion kit, the compression ratios employed, and due to performance limitations inherent in low pressure natural gas introduction through the intake valve.

The introduction of gasoline into cylinders for combustion has progressed due to advances in technology from being blended with air in a carburetor to being port injected into intake ports, both methods by which gasoline is introduced into the combustion chambers as part of the intake charge. The latest development has been injecting gasoline directly into the cylinders. Direct injection pressures are very high, for example 30,000 pounds per square inch (psi) (206,842.7 kilopascals (kPa)), in order to overcome in-cylinder pressure and to atomize the gasoline as it is injected to improve combustion efficiency. Gasoline being a liquid fuel is an incompressible fluid and is easily and quickly pressurized to the required pressure for direct injection. Because of the relatively high pressure differential between fuel rail pressure and in-cylinder pressure, the fuel flow rate is controllable and predictable. By controlling the amount of fuel delivered to the cylinder the amount of power created from combustion can also be controlled. Higher compression ratios are allowed in direct injection engines with less danger of knocking, defined as the premature ignition of fuel in the combustion chamber. Direct injection also means that the fuel does not displace air from the intake charge drawn into the combustion chamber through the intake ports.

Since gaseous fuels like natural gas are compressible fluids it is more difficult to manage higher injection pressures and there is an energy penalty associated with compressing gaseous fuels to higher pressures. Accordingly, conventional gaseous fuel systems have favored relatively low pressure injection systems. For example, an injection pressure in the range of 30 to 300 psi (206.8 to 2,068.4 kPa) involves fewer technical challenges than injection at high pressure and is adequate for injection into the intake air stream. After market systems typically employ low pressure port injection strategies for natural gas in dual-fuel and bi-fuel vehicles. However, because the fuel is pre-mixed with the intake air, natural gas spark ignition engines operate at modest compression ratios in the range of 9:1 to 12:1, in order to prevent engine knock, which can cause serious engine damage. Compared to engines with higher compression ratios, these engines operate at lower brake mean effective pressure (BMEP) and peak pressure levels.

High pressure direct injection of natural gas, that is, injection beginning late in the compression stroke, for example 20° before and after top dead center, involves greater technical challenges in the fuelling system. For engines operating with this architecture, the natural gas fuel rail pressure is on the order of 3,000 psi (20,684.3 kPa). This pressure is not as high as liquid fuels because there is no need to atomize a gaseous fuel, but the pressure still needs to be high enough to overcome the in-cylinder pressure and to allow fuel flow rates high enough to inject the required amount of fuel in the time available. However, even at this relatively low injection pressure, compared to liquid fuels, there is still a significant energy penalty for pressurizing the fuel and there is a significant capital cost associated with equipment needed to raise the gaseous fuel pressure. The high pressure equipment includes fuel compressors and fuel injectors. Designing high pressure, natural gas fuel injectors that inject a precise quantity of fuel into the combustion chamber has technical challenges not associated with low pressure, natural gas injection. The high pressure injection window for natural gas is typically smaller than in low pressure injection. It is known that as the on-time of the injector is decreased ballistic mode effects in the injector can decrease the accuracy of the quantity of fuel delivered. These factors are no deterrent for large heavy duty vehicles that use a lot of fuel and that require higher efficiency and higher torque. However, these same factors can deter the acceptance of this technology for light duty vehicles which consume less fuel and have lower power requirements.

Bi-fuel vehicles have traditionally been gasoline fuelled vehicles adapted to be capable of being fuelled with a different fuel. This has resulted in the most current gasoline fuel systems being combined with a gaseous fuel system. Now that the latest designs for gasoline engines use injectors to inject gasoline directly into the combustion chamber the problem to be solved has been designing a complementary fuel system for operation using another fuel, like natural gas. A typical solution would be to add the natural gas upstream of the combustion chamber, for example using port injectors. However, when combining conventional direct-injection gasoline injectors and either port or direct injectors of natural gas in bi-fuel vehicles, under normal operating conditions, the gasoline injectors are subjected to intense heat. When operating with gasoline, the gasoline fuel injectors are cooled, in part, by liquid fuel running through them. This cooling does not happen when operating in CNG mode for extended periods of time. Then, the uncooled gasoline injectors heat up and can become damaged. Additionally, liquid fuel held inside the charged injectors begins to form deposits which tend to restrict the flow of fuel, with this adversely affecting injector behavior. The longer CNG mode continues with dormant gasoline injectors the greater the risk for accumulation and hardening of deposits inside the gasoline injector.

U.S. Pat. No. 7,832,381, issued Nov. 16, 2010 to Pott et al., discloses a method of operating an internal combustion engine of a motor vehicle, that selectively uses gasoline or ethanol by direct injection into combustion chambers, and optionally instead of or in addition to injection of gasoline or ethanol the internal combustion engine is operated with a gaseous fuel, for example compressed natural gas (CNG) or liquefied petroleum gas (LPG) which is introduced with the intake air. Pott et al. teach that fouling of direct-injection gasoline injectors in CNG gas mode is monitored by this method and damage to the gasoline injectors is avoided by means of periodic changeovers to gasoline mode of operation, so that the flow of gasoline through the injectors acts to keep them cool. This method results in greater use of gasoline in order to maintain the integrity of the gasoline injectors, which increases emissions of pollutants from combustion and which can lead to greater fuel costs and more frequent trips to fuelling stations in order to maintain the fuel available in multiple fuel tanks.

European Patent Publication No. EP 2,009,277A1, published on Dec. 31, 2008 for Mats Morén, discloses an engine system with injection of a liquid fuel directly into the combustion chamber through liquid fuel injectors, and gaseous fuel injectors arranged to inject gaseous fuel into the intake port of the engine. Further, the engine system comprises means to selectively inhibit supply of the liquid fuel to the liquid fuel injectors. The gaseous fuel supply system is arranged to communicate with the liquid fuel injectors through inter-fuel system conduits, fuel pressure sensors and fuel conduit shut-off valves so that the gaseous fuel can be temporarily directed to the liquid fuel injectors in order to purge remaining liquid fuel therefrom during switchover to a gaseous fuel mode of operation.

The present apparatus and method provide improved delivery of fuel to a flexible-fuel internal combustion engine.

SUMMARY OF THE INVENTION

An improved apparatus delivers two fuels to a combustion chamber of an internal combustion engine. The apparatus comprises a first fuel system, a second fuel system, a first fuel injector, a second fuel injector and a computer. The first fuel system comprises a first fuel supply and a first fuel pressure regulator operatively connected with the first fuel supply. The first fuel supply is a source of gaseous fuel. The first fuel injector is disposed to directly inject the gaseous fuel into the combustion chamber and is operatively connected with the first fuel pressure regulator. The second fuel system comprises a second fuel supply, a fuel pump operatively connected with the second fuel supply and a second fuel pressure regulator operatively connected with the fuel pump. The second fuel supply is a source of a liquid fuel. The second fuel injector is disposed to inject the liquid fuel upstream of an intake valve operative to admit an intake charge into the combustion chamber. The second fuel injector is operatively connected with the second fuel pressure regulator. The computer is operatively connected with the first fuel injector and the second fuel injector to actuate injection of fuel therefrom. The computer is programmed to command a gaseous-to-liquid fuel ratio as a function of inputs comprising at least one of gaseous fuel storage pressure, gaseous fuel injection pressure, gaseous fuel mass, engine speed, engine torque, inlet air temperature, inlet air humidity, intake air manifold pressure, intake air mass, knock detection, operating history, torque command, and emissions.

In preferred embodiments, the gaseous fuel is natural gas or methane, and the liquid fuel is gasoline or ethanol gasoline blends. The first fuel pressure regulator can be a single-step regulator, a continuously variable regulator or a multi-step regulator. The first fuel pressure regulator regulates the gaseous-fuel injection pressure between 10 bar and 300 bar, and preferably between 10 bar and 40 bar and more preferably between 10 bar and 20 bar. The second fuel pressure regulator regulates the liquid-fuel injection pressure between 2 bar and 10 bar, and preferably between 2 bar and 6 bar. In some embodiments the internal combustion engine can be shut-off after idling for a predetermined idle-time threshold. The first fuel injector can be actuated to introduce a stratified fuel charge in the combustion chamber during cold-start of the internal combustion engine such that emissions are reduced and stability is improved.

In preferred embodiments, the computer is programmed to select one of a gaseous-fuel operating mode or a liquid-fuel operating mode, to selectively actuate the first fuel injector to inject the gaseous fuel during the gaseous-fuel operating mode, and to selectively actuate the second fuel injector to inject the liquid fuel during the liquid-fuel operating mode. The gaseous fuel is injected no less than 40°, and preferably no less than 60°, before top dead center during a compression stroke associated with the combustion chamber during the gaseous fuel operating mode. The gaseous-to-liquid fuel ratio is mathematically undefined during the gaseous-fuel operating mode and is zero during the liquid-fuel operating mode. The gaseous-fuel operating mode or the liquid-fuel operating mode can be selected as a function of inputs comprising at least one of gaseous-fuel storage pressure, gaseous-fuel mass, liquefied gaseous-fuel level, liquefied gaseous-fuel volume, liquefied gaseous-fuel mass and gaseous-fuel injection pressure. During high load conditions the first fuel injector is actuated after the intake valve closes during a compression stroke associated with the combustion chamber. During partial load and high speed operation the first fuel injector can be selectively actuated to start injecting gaseous fuel while the intake valve is open. When a predetermined condition is detected during the gaseous-fuel operating mode the computer is further programmed to define the gaseous-to-liquid fuel ratio and to selectively actuate the second fuel injector. The predetermined condition is at least one of a lubricate-time threshold, a cool-time threshold, a clean-time threshold or a liquid-fuel-cycle-time threshold, and the predetermined condition is detected when at least one of the claimed thresholds is met or exceeded. The computer is further programmed to selectively actuate the second fuel injector during the gaseous-fuel operating mode as a function of inputs comprising at least one of average crank rotational speed, gaseous fuel consumed, average torque, inlet temperature, mass air flow, engine temperature, coolant temperature and time since the second fuel supply was filled. When a predetermined condition is detected during the liquid-fuel operating mode the computer is further programmed to command a gaseous-to-liquid fuel ratio greater than zero and to selectively actuate the first fuel injector. When the predetermined condition is a threshold level of engine knock, the apparatus further comprises an engine knock sensor. The computer is responsive to an output of the engine knock sensor to selectively actuate the first fuel injector during the liquid-fuel operating mode when the output meets or exceeds the threshold level of engine knock.

When the predetermined condition is a threshold level of emissions, the apparatus further comprises an emissions sensor. The computer is programmed responsive to an output of the emissions sensor to selectively actuate the first fuel injector during the liquid-fuel operating mode when the output meets or exceeds the threshold level of emissions. In preferred embodiments, the computer can select a dual-fuel operating mode and selectively actuate the first and second fuel injectors during the dual-fuel operating mode. The gaseous-to-liquid fuel ratio is mathematically defined and greater than zero during the dual-fuel operating mode.

An improved internal combustion engine apparatus comprises a combustion chamber; an intake valve operable to admit an intake charge into the combustion chamber; a first fuel injector disposed to inject a gaseous fuel directly into the combustion chamber; a second fuel injector disposed to inject a liquid fuel into the intake charge upstream of the intake valve; and a computer operatively connected with the first fuel injector and the second fuel injector to actuate injection of fuel respectively therefrom. The computer is programmed to command a gaseous to liquid fuel ratio as a function of inputs comprising at least one of gaseous fuel storage pressure, gaseous fuel injection pressure, gaseous fuel mass, engine speed, engine torque, inlet air temperature, inlet air humidity, knock detection, operating history, torque command, and emissions.

An improved method of delivering two fuels to a combustion chamber of an internal combustion engine comprises:
  commanding a gaseous-to-liquid fuel ratio as a function of inputs comprising at least one of gaseous fuel storage pressure, gaseous fuel injection pressure, gaseous fuel mass, engine speed, engine torque, inlet air temperature, inlet air humidity, knock detection, operating history, torque command, and emissions;

injecting a gaseous fuel directly into the combustion chamber as a function of the gaseous-to-liquid fuel ratio; and injecting a liquid fuel upstream of an intake valve as a function of the gaseous-to-liquid fuel ratio.

In preferred embodiments, the method further comprises selecting one of a gaseous-fuel operating mode or a liquid-fuel operating mode; injecting the gaseous fuel directly into the combustion chamber during the gaseous-fuel operating mode; and injecting the liquid fuel upstream of an intake valve into an intake charge during the liquid-fuel operating mode. The gaseous-to-liquid fuel ratio is mathematically undefined during the gaseous-fuel operating mode and is zero during the liquid-fuel operating mode. The gaseous fuel is injected not less than 40°, and preferably not less than 60°, before top dead center during a compression stroke associated with the combustion chamber. In still further preferred embodiments the method further comprises selecting a dual-fuel operating mode, the gaseous-to-liquid fuel ratio is mathematically defined and greater than zero during the dual-fuel operating mode; injecting the gaseous fuel directly into the combustion chamber during the dual-fuel operating mode; and injecting the liquid fuel upstream of an intake valve into an intake charge during the dual-fuel operating mode. The gaseous-to-liquid fuel ratio can decrease during the dual-fuel operating mode as a pressure of the gaseous-fuel decreases such that operation on gaseous-fuel is extended. During the dual-fuel operating mode the gaseous-to-liquid fuel ratio is preferably selected to maintain emissions below an acceptable level.

DETAILED DESCRIPTION OF PREFERRED EMBODIMENT(S)

Figure 1:
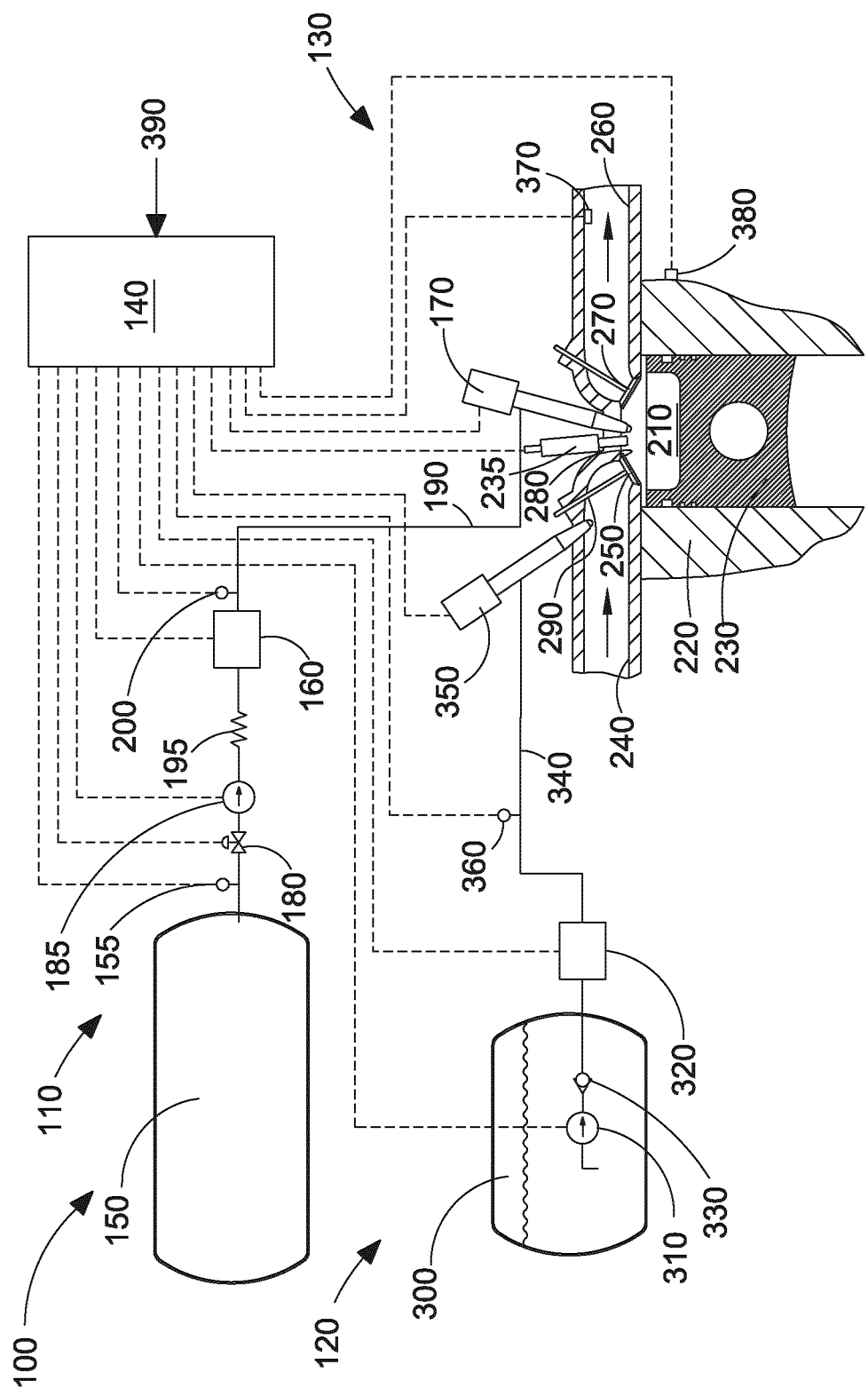
FIG. 1 is a schematic view of a gaseous fuel direct injection and liquid fuel port injection engine.

Referring to the schematic view of FIG. 1, there is shown an apparatus 100 for fuelling an internal combustion engine with a gaseous fuel and/or a liquid fuel, the manner by which will now be described. Apparatus 100 includes a direct-injection fuel system 110, a port-injection fuel system 120, an engine 130 and an electronic controller 140. Only a cross-section showing the combustion chamber of one engine cylinder is shown but those familiar with the technology involved here will understand that the engine comprises other components and typically a plurality of cylinders. Engine 130 can be for a vehicle, and can also be employed in marine, locomotive, mine haul, power generation or stationary applications. Electronic controller 140 communicates with and commands both direct-injection fuel system 110 and port-injection fuel system 120 to deliver fuel for combustion in engine 130. In the present example, electronic controller 140 is a computer comprising a processor and memories, including a permanent memory, such as FLASH or EEPROM, and a temporary memory, such as SRAM or DRAM, for storing and executing a program. In a preferred embodiment electronic controller 140 is an engine control unit (ECU) of engine 130.

Direct-injection fuel system 110 comprises storage vessel 150, which is made to store the gaseous fuel. The gaseous fuel can be compressed natural gas, methane, hydrogen or other fuels that are in a gaseous phase at room temperature and atmospheric pressure. In the illustrated embodiment, the gaseous fuel can be stored in storage vessel 150, which is rated to store the gaseous fuel at a predetermined storage pressure, and in the present example the gaseous fuel can be stored up to a pressure of 700 bar. Pressure sensor 155 measures the pressure of the gaseous fuel in vessel 150, which decreases as the gaseous fuel therein is consumed by engine 130. Storage vessel 150 is designed to comply with local regulations which can specify safety factors for ensuring containment of the gaseous fuel even in the event of impact, for example if storage vessel 150 is a vehicular fuel tank that could be involved in a vehicle collision. In addition to safety factors and design strength requirements, local regulations typically impose a maximum storage pressure. In other embodiments, storage vessel 150 can be a cryogenic storage vessel holding a multiphase fluid at cryogenic temperatures including a liquefied gaseous fuel, such as liquefied natural gas (LNG) or liquefied propane gas, and vapor such as natural gas vapor or propane gas vapor. In this situation, fuel system 110 can comprise a liquid pump and an accumulator. In a stationary application, storage vessel 150 can be replaced by a gaseous-fuel supply conduit connected with a commercial gaseous-fuel supply line.

Gaseous-fuel pressure regulator 160 is operable to regulate the gaseous-fuel pressure from storage vessel 150 to between 10 and 300 bar, and preferably to between 10 and 40 bar in gaseous-fuel supply rail 190, and more preferably to between 10 and 20 bar to increase or maximize useable mass in storage vessel 150. Regulator 160 supplies gaseous fuel at a regulated pressure to gaseous-fuel direct injector 170. Optional pressure increasing device 185, for example a gas compressor, can increase the pressure of the gaseous fuel from vessel 150 when the pressure drops below the lower limit of 10 bar in the ranges above, or below an intermediate pressure depending upon operating requirements. Optional heat exchanger 195 operates to reduce the temperature of the gaseous fuel which is elevated due to pressure increasing device 185. In a preferred embodiment, direct-injection fuel system 110 is a common rail system, meaning that the gaseous fuel is delivered to gaseous-fuel direct injector 170 at injection pressure. In such a common rail system, pressure sensor 200 can be employed to measure the fuel pressure in gaseous-fuel supply rail 190 so that gaseous-fuel pressure regulator 160 can be operated to maintain gaseous fuel injection pressure between a predetermined low and high set point. Gaseous-fuel pressure regulator 160 is preferably a single-step type pressure regulator; however in other embodiments, pressure regulator 160 can be a continuously-variable type or a multi-step type pressure regulator. The advantage of a continuously variable type or multi-step type pressure regulator is the ability to adjust the pressure in the gaseous-fuel supply rail 190 according to the operating conditions of engine 130, thereby improving the efficiency of engine 130 and lowering emissions accordingly. Control valve 180 is operable under command of electronic controller 140 to enable and disable communication of the gaseous fuel between storage vessel 150 and gaseous-fuel pressure regulator 160.

The flow of air into combustion chamber 210 from intake air manifold 240 is controlled by intake valve 250, which can be opened during intake strokes of piston 230. Like conventional gasoline engines, the disclosed engine can employ a turbocharger (not shown) to pressurize the intake air or the engine can be naturally aspirated. Gaseous-fuel direct injector 170 introduces the gaseous fuel directly into combustion chamber 210, which is generally defined by a bore provided in cylinder block 220, the cylinder head, and piston 230, which is movable up and down within the bore. Gaseous-fuel direct injector 170 is shown centrally located in the cylinder head, but can be located in cylinder block 220 in a side mounted orientation in alternative embodiments. Generally, the centrally located injector has better efficiency, whereas the side mounted injector has better performance due to increased cooling effect. The gaseous-fuel/air mixture is ignited with ignition device 235 in combustion chamber 210. In a preferred embodiment ignition device 235 is a spark plug, but in other embodiments can be an ignition plug, a glow plug, a laser ignition device or a pilot diesel injection. The glow plug when employed is typically part of a torch ignition system. Combustion products are expelled from combustion chamber 210 into exhaust manifold 260 through exhaust valve 270, which is opened during exhaust strokes of piston 230. Sensor 370 in exhaust manifold 260 is operable to detect emissions, and in particular $O_2$ and/or $NO_x$ concentrations in the combustion products in order to influence the fuelling of engine 130. Sensor 380, such as an accelerometer, is disposed adjacent a wall of cylinder 220 in the present example, however other locations are possible such as the bearing cap, and is operable to detect vibrations from combustion chamber 210 characteristic of engine knock. Electronic controller 140 is responsive to outputs of sensors 370 and 380. The operation of sensors 370 and 380 will be described in more detail below.

Electronic controller 140 is programmable to control the operation of gaseous-fuel pressure regulator 160, pressure increasing device 185 (when required) and control valve 180 to control the pressure of the gaseous fuel in gaseous-fuel supply rail 190. For example, electronic controller 140 can command gaseous-fuel pressure regulator 160 to decrease fuel pressure in gaseous-fuel supply rail 190 when engine 130 is operating in idle mode, and to increase fuel pressure when engine 130 is operating in full-load mode.

Electronic controller 140 is also programmable to selectively command the timing for opening and closing of a valve member in gaseous-fuel direct injector 170 that respectively controls the injection of the gaseous fuel into combustion chamber 210. For example, electronic controller 140 can be programmed for early-cycle injection timing to control gaseous-fuel direct injector 170 so that the gaseous fuel is introduced into combustion chamber 210 starting before intake 250 closes for partial load and after intake valve 250 closes for high load and ending no later than 40° before top dead center (BTDC) during the compression stroke of piston 230, and preferably no later than 60° BTDC. Partial load is defined herein to mean between 0 to 90% of the full load capacity of engine 130, and high load is defined herein to mean between 90% and 100%. Injecting before intake valve 250 closes under partial load, that is, when engine 130 is partially throttled, reduces pumping losses and results in a premixed, homogenous gaseous-fuel/air mixture in combustion chamber 210.

As the load on engine 130 increases from 0% to 100%, the start of injection timing is delayed further into the intake stroke during partial loading, and further into the compression stroke during high loading. For the compression ratio used for engine 130, injecting no later than 60° BTDC results in a gaseous-fuel jet having good speed, and for a substantial portion of the gaseous-fuel injection pressure the speed is sonic, that is the ratio of gaseous fuel injection pressure and cylinder pressure is greater than 2. Typically, intake valve 250 closes around 150° before top dead center during the compression stroke of piston 230. Compared to fuel injection later in the compression cycle, fuel injection within this range of the compression cycle generally does not require a high pressure compressor and a subsequent aftercooler between storage vessel 150 and gaseous-fuel pressure regulator 160. In contrast, the present illustrative example employs a relatively simple gaseous-fuel pressure regulator 160 to regulate pressure in gaseous-fuel supply rail 190. This allows for rapid re-starting in a stop-start system where engine 130 is turned off by electronic controller 140 after idling for a predetermined idle-time threshold, for example, while waiting at a traffic light, or while excessively idling in congested traffic and when being employed as part of a hybrid electric power train. In this situation, engine 130 can be started instantly since target fuel pressure in gaseous-fuel supply rail 190 is lower than fuel pressure in storage vessel 150 when engine 130 is started, requiring only a minor pressure drop that is quickly achieved by gaseous-fuel pressure regulator 160. That is, there is no need to pressurize the gaseous fuel delivery system using a pump or compressor.

When gaseous-fuel injection occurs later in the compression cycle, for example starting at 20° before top dead center in the compression stroke, a high pressure compressor is required to raise the fuel pressure in gaseous-fuel supply rail 190 in order to overcome higher in-cylinder injection pressures, and this introduces a parasitic load that is required to build-up the pressure before injection can occur and this can delay starting of the vehicle. By using stratification techniques to introduce a stratified fuel charge during the compression cycle and additional injections during the combustion cycle, other advantages of gaseous-fuel injection timing no later than 40° BTDC during the compression stroke is reduction of cold start emissions and improved stability. Cold start emissions are emissions during start-up of apparatus 100 after being shut-off for a predetermined cold-start-time threshold or after engine temperature in apparatus 100 is below a predetermined cold-start-temperature threshold. And yet another advantage for some operating embodiments, at high engine speeds electronic controller 140 can command gaseous-fuel direct injector 170 to begin injecting gaseous fuel into combustion chamber 210 before intake valve 250 is closed to obtain a better gaseous-fuel/air mixture by allowing more time for mixing. In this situation, good mixing comes at the expense of volumetric efficiency due to displacement of air by the gaseous fuel, leading to a loss of up to 10% of BMEP at a given manifold pressure. This reduction in BMEP can be offset by turbo-charging. Good mixing of fuel and air results in fuel that is combusted with lower overall emissions, and poor mixing leads to higher hydrocarbons and carbon monoxide emissions and lower overall efficiency. And still a further advantage for operating modes that fuel primarily with the gaseous fuel is higher output potential when directly injecting the gaseous fuel after intake valve 250 is closed, compared to previous engines that port inject the gaseous fuel. This is especially true for a naturally aspirated engine or for a turbocharged engine at low speeds.

The gaseous-fuel injection timing can be predetermined responsive to engine operating conditions determined from measured parameters that are inputted into electronic controller 140, and the input of such parameters among others is represented by arrow 390.

Port-injection fuel system 120 comprises storage vessel 300, which is made to store the liquid fuel, which in the present embodiment is gasoline (petrol), and in other embodiments can be ethanol, blends of ethanol, or liquefied propane gas (LPG). Liquid fuel pump 310 is operable to deliver the liquid fuel from storage vessel 300 to liquid-fuel pressure regulator 320. Check valve 330 allows the liquid fuel to flow towards liquid-fuel pressure regulator 320, and prevents the liquid fuel from the pressure regulator flowing back towards liquid fuel pump 310. There are alternative liquid-fuel supply systems used in port injection systems which are also included in the scope of the present disclosure. For example, in alternative embodiments, liquid-fuel pressure regulator 320 can further comprise a return outlet that communicates with a conduit connected with storage vessel 300 to return fuel thereto in order to regulate liquid-fuel pressure. Liquid-fuel pressure regulator 320 is operable to deliver liquid fuel under pressure from storage vessel 300 to liquid-fuel port injector 350 via liquid-fuel supply rail 340. In the present example liquid-fuel pressure maintained by pressure regulator 320 is within the range of 2 bar to 10 bar, and preferably within the range of 2 bar to 6 bar; however in other examples this range can vary. In a preferred embodiment, port-injection fuel system 120 is a common rail system, meaning that the liquid fuel is delivered to liquid-fuel port injector 350 at injection pressure. In such a common rail system, pressure sensor 360 can be employed to measure the liquid-fuel pressure in liquid-fuel supply rail 340 so that liquid-fuel pressure regulator 320 can be operated to maintain liquid-fuel injection pressure between a predetermined low and high set point.

Under selective command of electronic controller 140, liquid-fuel port injector 350 introduces the liquid fuel upstream of intake valve 250. In a preferred embodiment injector 350 is employed in a multi-point injection system in which there is a fuel injector for each intake port. In alternative embodiments, injector 350 can be a single point injector, a continuous injector or a central port injector. Depending upon engine operating conditions it is possible that liquid-fuel port injector 350 is injecting the liquid fuel for up to 90% of the 720 degree crank angle for engine 130. Typically, injector 350 is aimed to spray at a back side of intake valve 250 such that the liquid fuel is vaporized due to heat from valve 250, and when valve 250 opens for the intake stroke of piston 230 the liquid fuel enters as a mist. The injected liquid fuel and the charge of air in the intake manifold 240 enter the combustion chamber 210 where the liquid-fuel/air mixture is compressed and ignited by ignition device 235. Electronic controller 140 is programmable to control the operation of liquid-fuel pump 310 and liquid-fuel pressure regulator 320 to control the pressure of the liquid fuel in liquid-fuel supply rail 340. Electronic controller 140 is also programmable to command the timing for opening and closing of a valve member in liquid-fuel port injector 350 that respectively controls the injection of the liquid fuel. The liquid-fuel injection timing can be predetermined responsive to engine operating conditions determined from measured parameters that are inputted into electronic controller 140, and the input of such parameters among others is represented by arrow 390.

Port-injection fuel system 120 for liquid fuel has several advantages over liquid-fuel direct injection systems. Port injecting liquid fuel lubricates intake valve 250 and reduces the likelihood of valve seat recession from occurring. As liquid fuel is introduced into combustion chamber 210 with the charge of air flowing in intake air manifold 240 it coats intake valve 250 with a thin layer of liquid fuel that lubricates the surface boundary between intake valve 250 and valve seat 280 and provides a low viscosity, liquid damping cushion. This lubrication results in less wear on valve seat 280 and intake valve 250 as the valve is continuously opened and closed. Port injecting liquid fuel also cleans intake valve 250. Trace lubricating oil seeping down stem 290 of intake valve 250 due to low intake manifold pressure carbonizes along intake valve 250 due to heat of combustion leaving carbon deposits. When these carbon deposits build up significantly the air flow is reduced which tends to choke engine 130 at higher speeds and also disrupts the air flow pattern. Port injected liquid fuel, which can comprise additives that further reduce the formation of carbon deposits, helps to keep the valve clean preventing carbon deposit build-up on stem 290 and the back of intake valve 250. Port injecting liquid fuel also helps to cool intake valve 250. It has been observed that peak pressure rise and possibly heat transfer coefficient from combustion of natural gas, especially with aggressive spark advance, can be greater than that from combustion of gasoline (petrol) causing increased heat transfer to and flexure in the face of intake valve 250 leading to valve seat fretting and recession. Running relatively cool liquid fuel over intake valve 250 helps to manage the temperature of the valve and improves material durability. When the liquid fuel is gasoline, port injection of gasoline can reduce the mass and number of particulate emissions compared to direct injection of gasoline.

Figure 2:
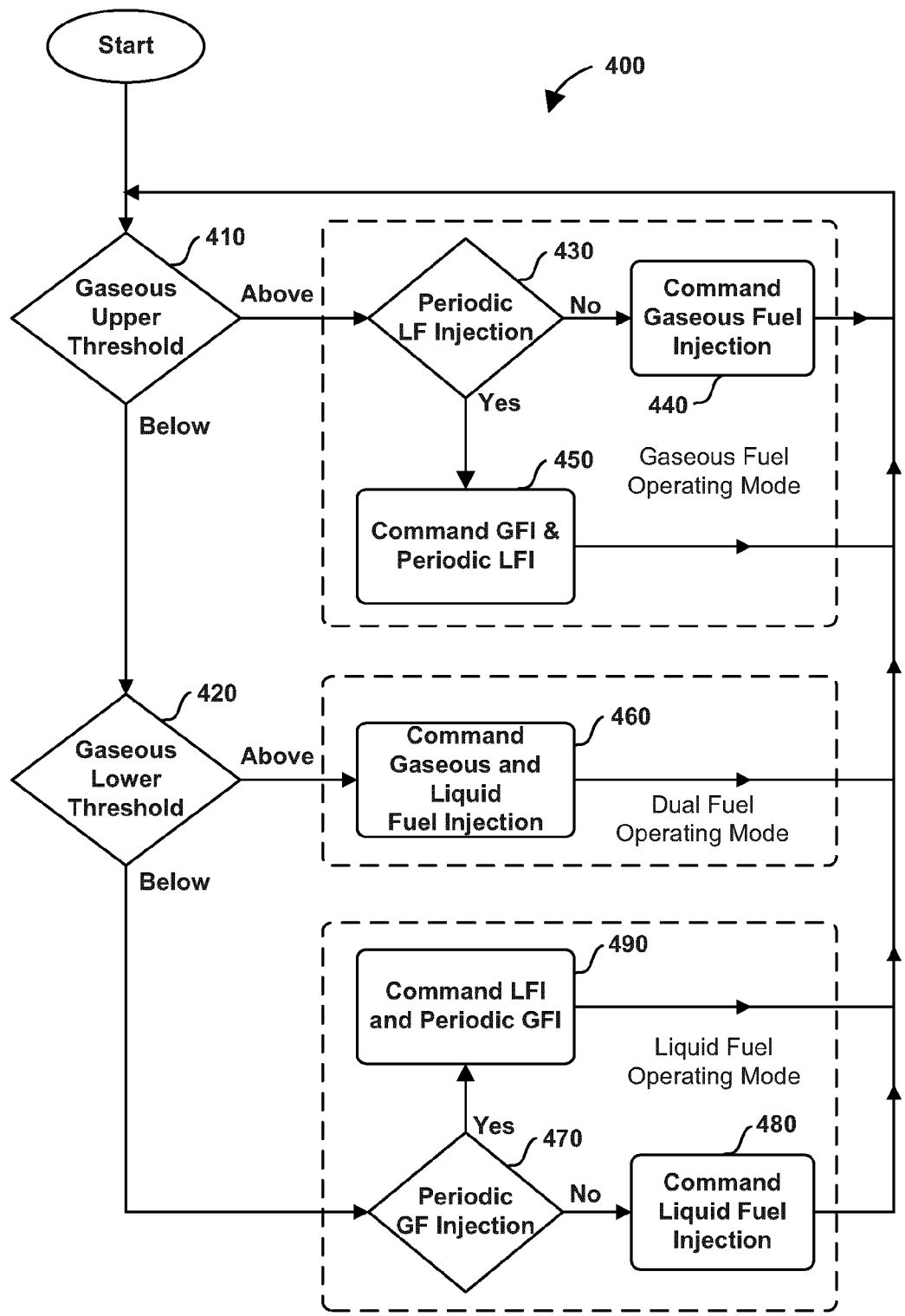
FIG. 2 is a flow chart of an operating mode selection algorithm for the engine of FIG. 1.
Figure 3:
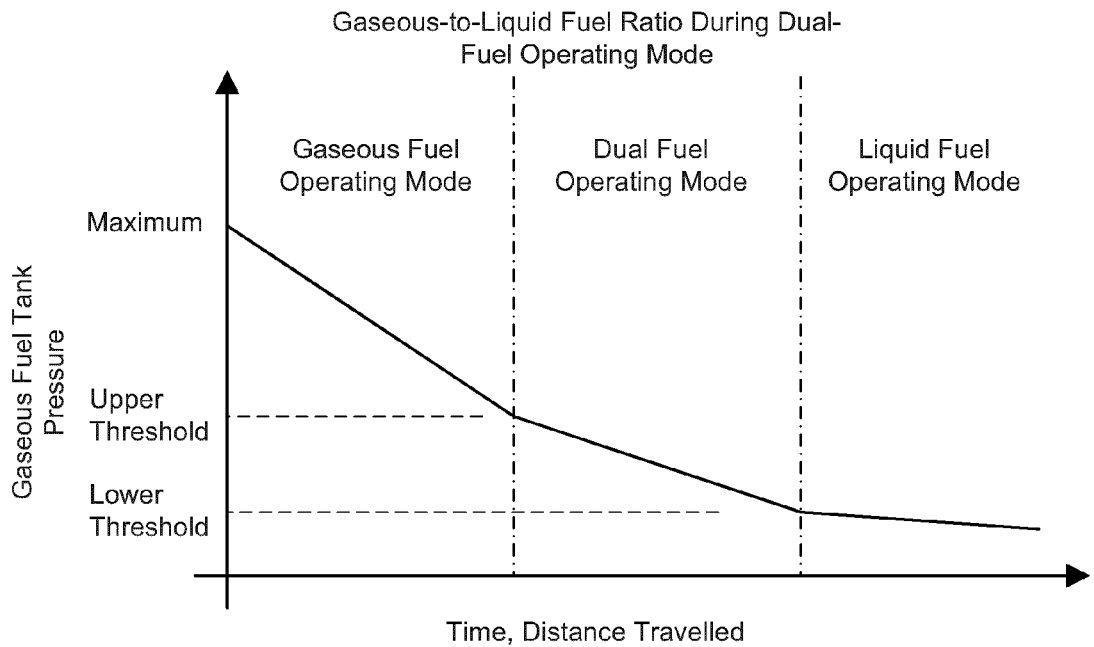
FIG. 3 is a chart of gaseous fuel tank pressure versus time or distance travelled for the engine of FIG. 1.

Referring now to FIGS. 2 and 3 the operation of engine 130 will now be described. Electronic controller 140 is programmed with fuel mode selection algorithm 400. Generally, engine 130 operates in a gaseous-fuel operating mode where engine 130 is fuelled primarily from gaseous fuel, but can have periodic injections of liquid fuel. In a liquid-fuel operating mode engine 130 is primarily fuelled with liquid fuel, but can have periodic injections of gaseous fuel. In a dual-fuel operating mode engine 130 is fuelled simultaneously from both gaseous fuel and liquid fuel. The dual-fuel operating mode intends injections of both gaseous fuel and liquid fuel primarily to extend the gaseous fuelling range of engine 130 while keeping average emissions below a predetermined level which in preferred embodiments, is less than or equal to levels attainable by the liquid fuel operating mode. Normally, the operating mode of engine 130 is determined by a quantity of gaseous fuel in storage vessel 150, which can be ascertained by a measurement of mass of gaseous fuel or a measurement of pressure of gaseous fuel in storage vessel 150 using sensor 155. In step 410 electronic controller 140 determines whether the quantity of the gaseous fuel in storage vessel 150 is above or below an upper threshold. Engine 130 is preferably in the gaseous-fuel operating mode when the quantity of the gaseous fuel is above the upper threshold, and is in either the dual-fuel or liquid fuel operating modes when it is below the upper threshold. Electronic controller 140 determines whether the quantity of the gaseous fuel in storage vessel 150 is above or below a lower threshold in step 420. Engine 130 is in the dual-fuel operating mode when the quantity of the gaseous fuel is above the lower threshold, and is in the liquid-fuel operating mode when it is below the lower threshold.

Figure 5:
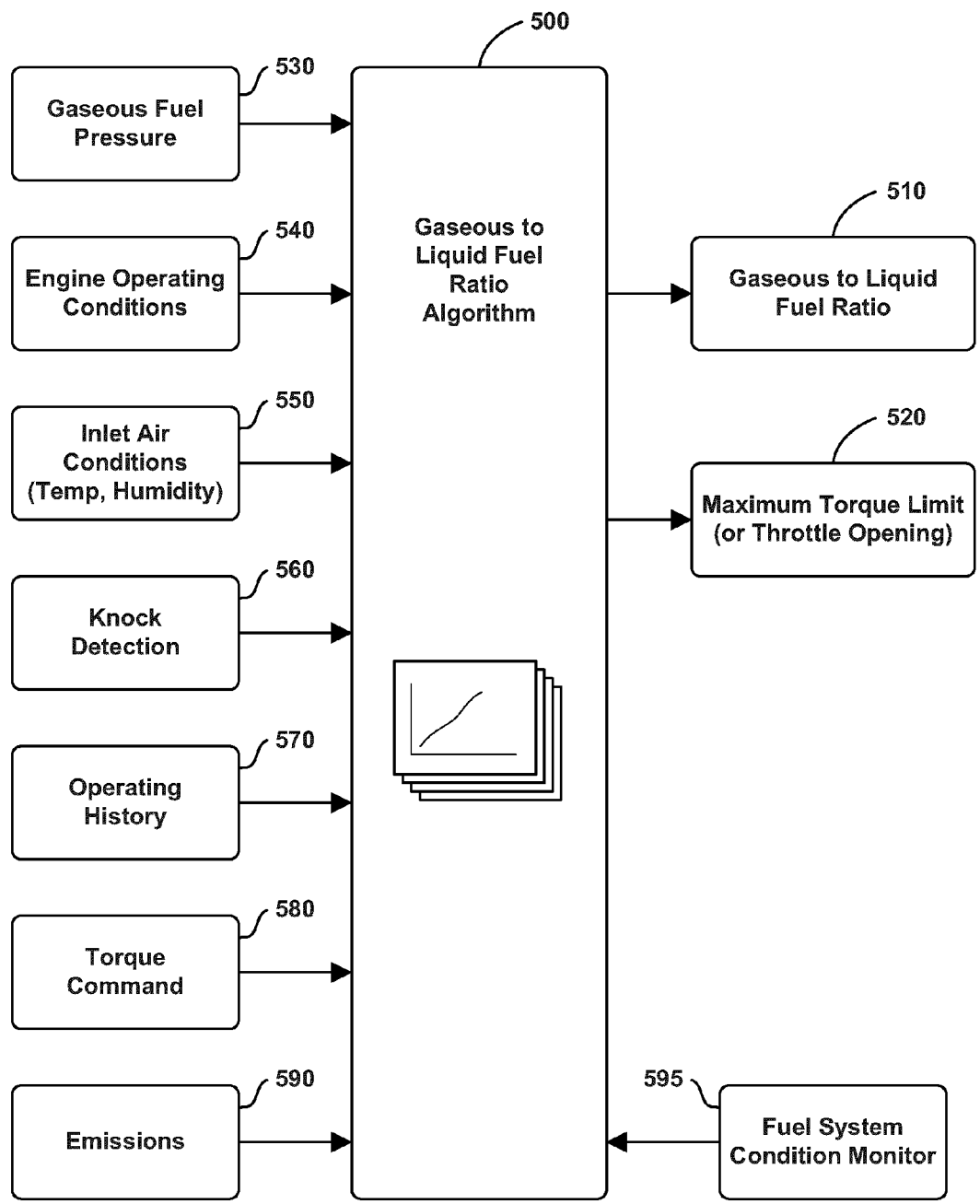
FIG. 5 is a schematic view of a gaseous-to-liquid fuel ratio algorithm comprising measured parameter inputs and control outputs for the engine of FIG. 1.

In each of the operating modes there can be gaseous fuel and liquid fuel injections during a single cycle of engine 130. With reference to FIG. 5, fuel ratio algorithm 500, which is programmed in electronic controller 140, can be used to determine gaseous-to-liquid fuel ratio 510 that can be used to command gaseous-fuel direct injector 170 and liquid-fuel port injector 350 to inject respective amounts of gaseous fuel and liquid fuel to obtain ratio 510. Algorithm 500 is responsive to measured parameters of engine 130 to generate ratio 510 and maximum torque limit 520. The measured parameters comprise, but are not limited to, gaseous fuel pressure 530 and temperature in storage vessel 150, which is representative of a quantity of gaseous fuel, engine operating conditions 540, inlet air conditions 550, knock detection 560, operating history 570, torque command 580, emissions 590 and fuel system condition monitor 595. Gaseous fuel pressure 530 includes storage pressure from sensor 155 and injection pressure from sensor 200. Engine operating conditions 540 comprise, but are not limited to, measured parameters such as vehicle speed, torque, engine coolant temperature, engine temperature, engine speed (RPM). Inlet air conditions can comprise air temperature and humidity, intake air manifold pressure and intake air mass. Operating history 570 comprises time since key-on, time and distance since last fill-up, time operating in the gaseous-fuel operating mode, the dual-fuel operating mode and the liquid-fuel operating mode, in addition to other parameters. Fuel system condition monitor 595 comprises respective models of tips of fuel injectors 170 and 350 for monitoring the performance and behavior of the tips based on other measured parameters input into algorithm 500. In alternative operating embodiments, when storage vessel 150 is a cryogenic storage vessel holding a multi-phase fluid at cryogenic temperatures comprising a liquefied gaseous fuel and a vapor, such as LNG and natural gas vapor or LPG and propane vapor, measured parameters can further include a level of the liquefied gaseous fuel, a volume of the liquefied gaseous fuel, a mass of the liquefied gaseous fuel, a pressure of the vapor, a volume of the vapor and a mass of the vapor. Normally, in the gaseous-fuel operating mode ratio 510 is mathematically undefined since no liquid fuel is normally injected. That is, gaseous-to-liquid fuel ratio 510 is defined as the quantity of gaseous fuel to be injected divided by the quantity of liquid fuel to be injected. When no liquid fuel is to be injected ratio 510 is mathematically undefined due to division by zero. However, ratio 510 is mathematically defined when there are periodic injections of liquid fuel in the gaseous-fuel operating mode. In the liquid-fuel operating mode ratio 510 is normally zero since no gaseous fuel is normally injected, however ratio 510 is greater than zero when there are periodic injections of gaseous fuel. In the dual-fuel operating mode ratio 510 is mathematically defined and greater than zero.

Referring back to FIG. 2, in the gaseous-fuel operating mode electronic controller 140 determines whether a periodic injection of liquid fuel is required in step 430. Electronic controller 140 commands a gaseous fuel injection in step 440 if a periodic injection of liquid fuel is not required, which is normally the case in this mode. It has been found that during the gaseous-fuel operating mode there are advantages to periodic injections of liquid fuel. In step 450 electronic controller 140 commands a gaseous fuel injection from gaseous-fuel direct injector 170, in addition to a liquid fuel injection from liquid-fuel port injector 350 if a periodic injection of liquid fuel is required. The periodic liquid fuel injection lubricates, cleans and cools intake valve 250, as discussed in detail above, and prevents carbon deposit build-up in liquid-fuel injector 350. Liquid-fuel port injector 350 heats up after engine 130 is shut-off and heat gets conducted from the engine into intake manifold 240 after coolant in engine 130 stops circulating. Operating in the gaseous-fuel operating mode for successive engine starts and stops can cause liquid fuel remaining in liquid-fuel port injector 350 to deteriorate over time and form carbon deposits. As these carbon deposits build-up over time they can affect the flow rate and spray pattern of the liquid fuel in liquid-fuel port injector 350. For these reasons periodic operation of liquid-fuel port injector 350 is beneficial. The frequency of such periodic operation of liquid-fuel port injector 350 would be less than that required for idle liquid-fuel direct injectors that directly inject liquid fuel into combustion chamber 210, since such direct injectors are exposed to hot combustion gases and the deterioration of liquid fuel is greatly accelerated. To achieve the benefits described above, electronic controller 140 can command injections from both gaseous-fuel direct injector 170 and liquid-fuel port injector 350 during a single engine cycle, or complete fuel substitution injections from liquid-fuel port injector 350. In either situation, the total energy content of the total fuel injected into combustion chamber 210 would be consistent with the fuelling requirement according to the current operating condition of engine 130. Electronic controller 140 can be programmed to selectively actuate liquid-fuel port injector 350 during the gaseous-fuel operating mode after a predetermined lubricate-time threshold, a predetermined cool-time threshold, a predetermined clean-time threshold, or a predetermined liquid-fuel-cycle-time threshold, or a combination of these thresholds, has been reached. The liquid-fuel-cycle-time threshold is defined herein to mean an amount of time in which the liquid fuel has been stored in tank 300 and not injected into combustion chamber 210; after the liquid-fuel-cycle-time threshold is reached a portion of the liquid fuel can be injected in order to periodically consume the liquid fuel. Alternatively, operating history 570 of engine 130, as seen in FIG. 5, can be used to determine whether a periodic injection of liquid fuel is required. Operating history 570 includes statistical information comprising, for example, the last time tank 300 was filled, hours of operation on gaseous fuel only and operating conditions while running on gaseous fuel only, such as average crank rotational speed, fuel consumed, average torque, inlet temperature, engine temperature, coolant temperature and mass air flow. It is advantageous to have periodic injections of the liquid fuel based on the last time tank 300 was filled such that the liquid fuel is consumed regularly and problems associated with reduced volatility due to vaporization, that is, degraded combustion performance, and water and oxidation contamination are reduced or minimized. This information along with other measured parameters of apparatus 100 can be used to select gaseous-to-liquid fuel ratio 510 that can be used when commanding fuel injection in step 450 shown in FIG. 2.

Figure 4:
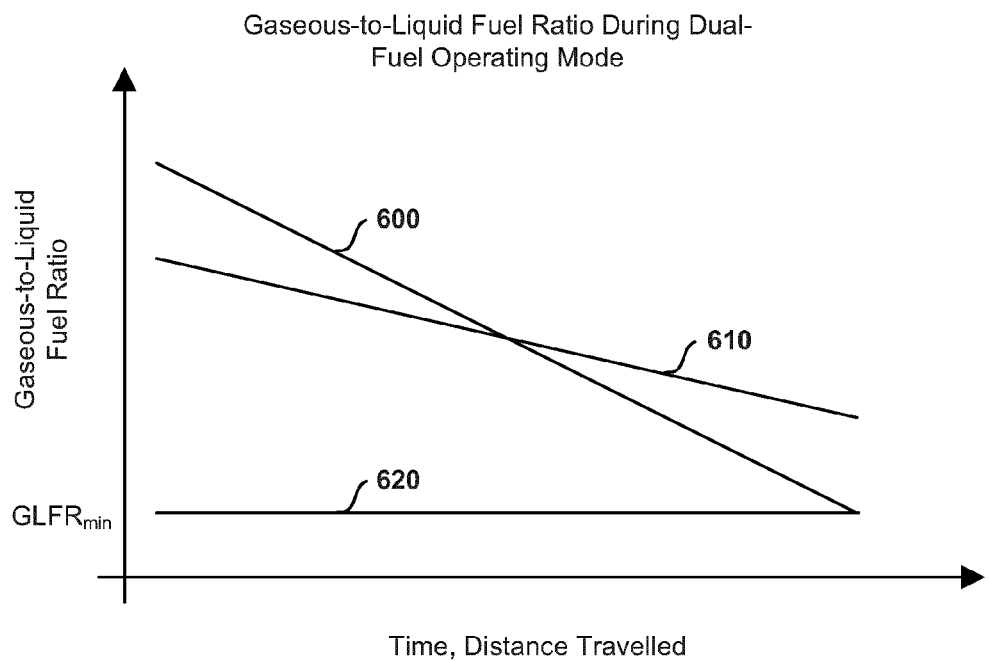
FIG. 4 is a chart of gaseous-to-liquid fuel ratio versus time or distance travelled.

In the dual-fuel operating mode electronic controller 140 commands gaseous fuel and liquid fuel injections in step 460. Algorithm 500 determines gaseous-to-liquid fuel ratio 510 that is used when commanding fuel injection in step 460. As gaseous-fuel pressure drops below the upper threshold in FIG. 3 algorithm 500 begins commanding a large gaseous-to-liquid fuel ratio in order to start introducing liquid fuel, initially at high speed operation than gradually further down the speed range as gaseous-fuel pressure continues to decrease. As gaseous-fuel pressure further continues to decrease gaseous-to-liquid fuel ratio 510 is gradually decreased in value in order to increase or maximize gaseous-fuel operation of engine 130. It is preferable not to deplete gaseous-fuel storage vessel 150 completely in order to protect nozzles of gaseous-fuel direct injectors 170 against over heating due to peak combustion loads when there is no gaseous-fuel pressure or flow, and to protect against engine knock due to the lower octane number for liquid fuel. The dual-fuel operating mode can be alternatively entered depending on operating history 570 and driver command, even though gaseous-fuel pressure is above the upper threshold, such that gaseous-to-liquid fuel ratio 510 can be adjusted to consume both gaseous fuel and liquid fuel. The driver of the vehicle can select the dual-fuel operating mode in order to increase or maximize liquid fuel consumption with the aim of depleting liquid-fuel tank 300 at the same time as gaseous-fuel storage vessel 150, or to even allow enough gaseous-fuel in reserve to get an extra refill of liquid fuel tank 300. For example, gaseous-fuel storage vessel 150 can provide a fuelling range of 300 km in the gaseous-fuel operating mode, and liquid-fuel tank 300 can provide a fuelling range of 150 km in the liquid-fuel operating mode. In the dual-fuel operating mode, also called a gaseous-fuel extended range mode, storage vessel 150 and tank 300 can be depleted completely providing a range of 450 km, that is a 150 km extended range for gaseous fuel operation. It is especially advantageous to allow the driver to command the dual-fuel operating mode in regions where there are only liquid-fuel refilling stations and no gaseous-fuel refilling stations within the fuelling range of the vehicle. Depending upon the gaseous-to-liquid fuel ratio 510 employed during the dual-fuel operating mode, it is possible to provide multiple refills of liquid-fuel tank 300 while still consuming gaseous fuel from storage vessel 150. For example, FIG. 4 illustrates three plots of gaseous-to-liquid fuel ratio 510 versus time or distance travelled. Plots 600 and 610 show that gaseous-to-liquid fuel ratio 510 decreases, that is more liquid fuel and less gaseous fuel is consumed, as engine 130 operates in the dual-fuel operating mode. Plot 600 has a greater magnitude slope than plot 610 meaning that the rate of switchover to liquid fuel is greater in plot 600. Plot 620 is representative of a minimum value for gaseous-to-liquid fuel ratio 510 needed to meet emissions standards that cannot be met with liquid fuel alone. When starting with a full gaseous-fuel storage vessel 150 and meeting minimum emission standards, the greatest number of refills of liquid-fuel tank 300 while in dual-fuel operating mode would occur when engine 130 operates with gaseous-to-liquid fuel ratio 510 equal to plot 620.

Referring back to FIG. 2, in the liquid-fuel operating mode electronic controller 140 determines whether periodic injections of gaseous fuel are required in step 470. Electronic controller 140 commands only liquid fuel injections in step 480 if periodic injections are not required, which is normally the case when operating in this mode. However, it has been found that during the liquid-fuel operating mode there can be certain operating conditions when there are advantages to periodic injections of gaseous fuel. When electronic controller 140 detects in step 470 an operating condition that warrants a gaseous fuel injection, in step 490 it commands a liquid fuel injection from liquid-fuel port injector 350, in addition to a gaseous fuel injection from gaseous-fuel direct injector 170. Knock detection 560 and emissions 590 measurements of engine 130, as seen in FIG. 5, can be used to determine whether a periodic injection of gaseous fuel is required. This information along with other measured parameters of apparatus 100 can be used to select gaseous-to-liquid fuel ratio 510 that can be used when commanding fuel injection in step 490. By injecting both liquid fuel and gaseous fuel during a single cycle of engine 130 the overall emissions of $NO_x$, particulate matter and hydrocarbons can be reduced compared to liquid fuel only injections. Also, gaseous fuel injections can help suppress engine knock, particularly when the gaseous fuel comprises methane, compared to when gasoline (petrol) alone is used during the liquid-fuel operating mode. Methane, the primary constituent of natural gas, has a higher octane number than petrol. A partial reduction in knock tendency occurs as methane fraction of total injected fuel increases. Methane injections can also enable an increased effective compression ratio during the liquid-fuel operating mode, improving efficiency and emissions by use of variable intake/exhaust valve activation or variable compression volume devices. Residual methane in combustion chamber 210 can be used to increase or maximize effective energy contribution from methane. The liquid-fuel operating mode is intended as a secondary operating mode and can operate with reduced torque due to the need to reduce compression ratio or limit intake manifold pressure, for example using the intake throttle or boost pressure control. It is preferable that storage vessel 150 not be completely depleted of gaseous-fuel. However it is possible that it does get depleted during operation of engine 130. In this situation, engine 130 can operate with reduced power output in order to protect nozzles of gaseous-fuel direct injectors 170 against overheating due to peak combustion loads when there is no gaseous-fuel pressure or flow.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An apparatus for delivering two fuels to a combustion chamber of an internal combustion engine, the apparatus comprising:
   (a) a first fuel system comprising a first fuel supply and a first fuel pressure regulator operatively connected with said first fuel supply, said first fuel supply comprising a source of a gaseous fuel;
   (b) a first fuel injector for directly injecting said gaseous fuel into said combustion chamber, said first fuel injector operatively connected with said first fuel pressure regulator;
   (c) a second fuel system comprising a second fuel supply, a fuel pump operatively connected with said second fuel supply and a second fuel pressure regulator operatively connected with said fuel pump, said second fuel supply comprising a source of a liquid fuel;
   (d) a second fuel injector for injecting said liquid fuel upstream of an intake valve operative to admit an intake charge into said combustion chamber, said second fuel injector operatively connected with said second fuel pressure regulator; and
   (e) a computer operatively connected with said first fuel injector and said second fuel injector to actuate injection of fuel respectively therefrom, said computer programmed to:
      (i) command a gaseous-to-liquid fuel ratio as a function of inputs comprising at least one of gaseous fuel storage pressure, gaseous fuel injection pressure, gaseous fuel mass, engine speed, engine torque, inlet air temperature, inlet air humidity, intake air manifold pressure, intake air mass, knock detection, operating history, torque command, and emissions;
      (ii) select a gaseous-fuel operating mode whenever a quantity of gaseous fuel is above an upper threshold whereby only gaseous fuel is employed in said gaseous fuel operating mode for the full load capacity of said engine and select a liquid-fuel operating mode when the quantity of gaseous fuel is below the upper threshold;

(iii) selectively actuate the first fuel injector to inject the gaseous fuel during the gaseous-fuel operating mode, the gaseous-to-liquid fuel ratio being mathematically undefined during the gaseous-fuel operating mode; and (iv) selectively actuate the second fuel injector to inject the liquid fuel during the liquid-fuel operating mode, the gaseous-to-liquid fuel ratio being zero during the liquid-fuel operating mode.

2. The apparatus of claim 1, wherein said gaseous fuel is selected from the group consisting of natural gas and methane.

3. The apparatus of claim 1, wherein said liquid fuel is selected from the group consisting of gasoline and ethanol/gasoline blends.

4. The apparatus of claim 1, wherein said first fuel pressure regulator is a single-step regulator.

5. The apparatus of claim 1, wherein said first fuel pressure regulator is one of a continuously variable pressure regulator and a multi-step regulator.

6. The apparatus of claim 1, wherein said first fuel pressure regulator regulates said gaseous-fuel injection pressure between 10 bar and 300 bar.

7. The apparatus of claim 1, wherein said first fuel pressure regulator regulates said gaseous-fuel injection pressure between 10 bar and 40 bar.

8. The apparatus of claim 1, wherein said first fuel pressure regulator regulates said gaseous-fuel injection pressure between 10 bar and 20 bar.

9. The apparatus of claim 1, wherein said second fuel pressure regulator regulates said liquid-fuel injection pressure between 2 bar and 10 bar.

10. The apparatus of claim 1, wherein said second fuel pressure regulator regulates said liquid-fuel injection pressure between 2 bar and 6 bar.

11. The apparatus of claim 1, wherein said computer is further programmed to shut-off said internal combustion engine after idling for a predetermined idle-time threshold.

12. The apparatus of claim 1, wherein said computer is further programmed to actuate said first fuel injector to introduce a stratified fuel charge in said combustion chamber during cold-start of said internal combustion engine resulting in at least one of reduced emissions and improved stability.

13. The apparatus of claim 1, wherein said gaseous fuel is injected no less than 40 degrees before top dead center during a compression stroke associated with said combustion chamber during said gaseous-fuel operating mode.

14. The apparatus of claim 1, wherein said gaseous fuel is injected no less than 60 degrees before top dead center during a compression stroke associated with said combustion chamber during said gaseous-fuel operating mode.

15. The apparatus of claim 1, wherein said computer is further programmed to select one of said gaseous-fuel operating mode and said liquid-fuel operating mode as a function of inputs comprising at least one of gaseous-fuel storage pressure, gaseous-fuel mass, liquefied gaseous-fuel level, liquefied gaseous-fuel volume, liquefied gaseous-fuel mass, and gaseous fuel injection pressure.

16. The apparatus of claim 1, wherein said computer is further programmed to selectively actuate said first fuel injector after said intake valve closes.

17. The apparatus of claim 1, wherein said computer is further programmed to selectively actuate said first fuel injector to start injecting gaseous fuel while said intake valve is open.

18. The apparatus of claim 1, wherein when a predetermined condition is detected during said gaseous-fuel operating mode, said computer is further programmed to mathematically define said gaseous-to-liquid fuel ratio and to selectively actuate said second fuel injector for periodic injection of liquid fuel.

19. The apparatus of claim 18, wherein said predetermined condition is at least one of a lubricate-time threshold, a cool-time threshold, a clean-time threshold, and a liquid-fuel-cycle-time threshold, and said predetermined condition is detected when at least one of said thresholds is met or exceeded.

20. The apparatus of claim 18, wherein said computer is further programmed to selectively actuate said second fuel injector during said gaseous-fuel operating mode as a function of inputs comprising at least one of average crank rotational speed, gaseous fuel consumed, average torque, inlet temperature, mass air flow, engine temperature, coolant temperature, and time since said second fuel supply was filled.

21. The apparatus of claim 1, wherein when a predetermined condition is detected during said liquid-fuel operating mode said computer is further programmed to command a gaseous-to-liquid fuel ratio greater than zero and to selectively actuate said first fuel injector for periodic injection of gaseous fuel.

22. The apparatus of claim 21, wherein said predetermined condition is a threshold level of engine knock, and said apparatus further comprises an engine knock sensor, said computer programmed responsive to an output of said engine knock sensor to selectively actuate said first fuel injector during said liquid-fuel operating mode when said output meets or exceeds said threshold level of engine knock.

23. The apparatus of claim 21, wherein said predetermined condition is a threshold level of emissions, and said apparatus further comprises an emissions sensor, said computer programmed responsive to an output of said emissions sensor to selectively actuate said first fuel injector during said liquid-fuel operating mode when said output meets or exceeds said threshold level of emissions.

24. The apparatus of claim 1, wherein said computer is further programmed to select a dual-fuel operating mode when the quantity of gaseous fuel is below the upper threshold and above a lower threshold and to select the liquid fuel operating mode when the quantity of gaseous fuel is below the lower threshold, and to selectively actuate said first and second fuel injectors during said dual-fuel operating mode, said gaseous-to-liquid fuel ratio being mathematically defined and having a value greater than zero during said dual-fuel operating mode.

25. An internal combustion engine apparatus comprising;
(a) a combustion chamber;
(b) an intake valve for admitting an intake charge into said combustion chamber;
(c) a first fuel injector for injecting a gaseous fuel directly into said combustion chamber;
(d) a second fuel injector for injecting a liquid fuel into said intake charge upstream of said intake valve; and
(e) a computer operatively connected with said first fuel injector and said second fuel injector to actuate injection of fuel respectively therefrom, said computer programmed to:

(i) command a gaseous to liquid fuel ratio as a function of inputs comprising at least one of gaseous fuel storage pressure, gaseous fuel injection pressure, gaseous fuel mass, engine speed, engine torque, inlet air temperature, inlet air humidity, intake air manifold pressure, intake air mass, knock detection, operating history, torque command, and emissions;

(ii) select a gaseous-fuel operating mode whenever a quantity of gaseous fuel is above an upper threshold whereby only gaseous fuel is employed in said gaseous fuel operating mode for the full load capacity of said engine and select a liquid-fuel operating mode when the quantity of gaseous fuel is below the upper threshold;

(iii) selectively actuate the first fuel injector to inject the gaseous fuel during the gaseous-fuel operating mode, the gaseous-to-liquid fuel ratio being mathematically undefined during the gaseous-fuel operating mode; and (iv) selectively actuate the second fuel injector to inject the liquid fuel during the liquid-fuel operating mode, the gaseous-to-liquid fuel ratio being zero during the liquid-fuel operating mode.

26. The apparatus of claim 25, wherein said gaseous fuel is selected from the group consisting of natural gas and methane.

27. The apparatus of claim 25, wherein said liquid fuel is selected from the group consisting of gasoline and ethanol/gasoline blends.

28. The apparatus of claim 25, wherein said computer is further programmed to selectively actuate said first fuel injector after said intake valve closes during a compression stroke associated with said combustion chamber.

29. The apparatus of claim 25, wherein said computer is further programmed to actuate said first fuel injector to start injecting gaseous fuel while said intake valve is open.

30. The apparatus of claim 25, wherein said computer is further programmed to shut-off said internal combustion engine after idling for a predetermined idle-time threshold.

31. The apparatus of claim 25, wherein said computer is further programmed to actuate said first fuel injector to introduce a stratified fuel charge in said combustion chamber during cold-start of said internal combustion engine resulting in at least one of reduced emissions and improved stability.

32. The apparatus of claim 25, wherein said first fuel injector has a gaseous fuel injection pressure between 10 bar and 40 bar.

33. The apparatus of claim 25, wherein said second fuel injector has a liquid fuel injection pressure between 2 bar and 6 bar.

34. The apparatus of claim 25, wherein said gaseous fuel is injected no less than 40 degrees before top dead center during a compression stroke associated with said combustion chamber during said gaseous-fuel operating mode.

35. The apparatus of claim 25, wherein said gaseous fuel is injected no less than 60 degrees before top dead center during a compression stroke associated with said combustion chamber during said gaseous-fuel operating mode.

36. The apparatus of claim 25, wherein said computer is further programmed to select one of said gaseous-fuel operating mode and said liquid fuel operating mode as a function of inputs comprising at least one of gaseous fuel storage pressure, gaseous fuel mass, liquefied gaseous fuel level, liquefied gaseous fuel volume, liquefied gaseous fuel mass, and gaseous fuel injection pressure.

37. The apparatus of claim 25, wherein when a predetermined condition is detected during said gaseous-fuel operating mode said computer is further programmed to define said gaseous-to-liquid fuel ratio and to selectively actuate said second fuel injector for periodic injection of liquid fuel.

38. The apparatus of claim 37, wherein said predetermined condition is at least one of a lubricate-time threshold, a cool-time threshold, a clean-time threshold, and a liquid-fuel-cycle-time threshold, and said predetermined condition is detected when at least one of said thresholds is met or exceeded.

39. The apparatus of claim 37, wherein said computer is further programmed to selectively actuate said second fuel injector during said gaseous-fuel operating mode as a function of inputs comprising at least one of average crank rotational speed, gaseous fuel consumed, average torque, inlet temperature, mass air flow, engine temperature, coolant temperature and time since said second fuel supply was filled.

40. The apparatus of claim 25, wherein when a predetermined condition is detected during said liquid-fuel operating mode said computer is further programmed to command said gaseous-to-liquid fuel ratio to have a value greater than zero and to selectively actuate said first fuel injector for periodic injection of gaseous fuel.

41. The apparatus of claim 40, wherein said predetermined condition is a threshold level of engine knock, and said apparatus further comprises an engine knock sensor, said computer programmed responsive to an output of said engine knock sensor to selectively actuate said first fuel injector during said liquid-fuel operating mode when said output meets or exceeds said threshold level of engine knock.

42. The apparatus of claim 40, wherein said predetermined condition is a threshold level of emissions, and said apparatus further comprises an emissions sensor, said computer programmed responsive to an output of said emissions sensor to selectively actuate said first fuel injector during said liquid-fuel operating mode when said output meets or exceeds said threshold level of emissions.

43. The apparatus of claim 25, wherein said computer is further programmed to select a dual-fuel operating mode when the quantity of gaseous fuel is below the upper threshold and above a lower threshold and to select the liquid fuel operating mode when the quantity of gaseous fuel is below the lower threshold, and to selectively actuate said first and second fuel injectors during dual-fuel operating mode, said gaseous-to-liquid fuel ratio being mathematically defined and having a value greater than zero during said dual-fuel operating mode.

44. A method of delivering a gaseous fuel and a liquid fuel to a combustion chamber of an internal combustion engine, the method comprising:

(a) commanding a gaseous-to-liquid fuel ratio as a function of inputs comprising at least one of gaseous fuel storage pressure, gaseous fuel injection pressure, gaseous fuel mass, engine speed, engine torque, inlet air temperature, inlet air humidity, intake air manifold pressure, intake air mass, knock detection, operating history, torque command, and emissions;

(b) selecting a gaseous-fuel operating mode whenever a quantity of gaseous fuel is above an upper threshold whereby only gaseous fuel is employed in said gaseous fuel operating mode for the full load capacity of said engine and selecting a liquid-fuel operating mode when the quantity of gaseous fuel is below the upper threshold;

(c) injecting the gaseous fuel directly into the combustion chamber during the gaseous-fuel operating mode, the gaseous-to-liquid fuel ratio being mathematically undefined during the gaseous-fuel operating mode; and (d) injecting the liquid fuel upstream of an intake valve during the liquid-fuel operating mode, the gaseous-to-liquid fuel ratio being zero during the liquid-fuel operating mode.

45. The method of claim 44, wherein said gaseous fuel is selected from the group consisting of natural gas and methane.

46. The method of claim 44, wherein said liquid fuel is selected from the group consisting of gasoline and ethanol/gasoline blends.

47. The method of claim 44, further comprising regulating said gaseous fuel injection pressure between 10 bar and 300 bar.

48. The method of claim 44, further comprising regulating said injection pressure of said gaseous fuel between 10 bar and 40 bar.

49. The method of claim 44, further comprising regulating said injection pressure of said gaseous fuel between 10 bar and 20 bar.

50. The method of claim 44, further comprising regulating said injection pressure of said liquid fuel between 2 bar and 10 bar.

51. The method of claim 44, further comprising regulating said injection pressure of said liquid fuel between 2 bar and 6 bar.

52. The method of claim 44, further comprising shutting off said internal combustion engine after idling for a predetermined idle-time threshold.

53. The method of claim 44, further comprising introducing a stratified fuel charge in said combustion chamber during cold-start of said internal combustion engine resulting in at least one of reduced emissions and improved stability.

54. The method of claim 44, further comprising injecting said gaseous fuel not less than 40 degrees before top dead center during a compression stroke associated with said combustion chamber.

55. The method of claim 44, further comprising injecting said gaseous fuel not less than 60 degrees before top dead center during a compression stroke associated with said combustion chamber.

56. The method of claim 44, wherein one of said gaseous-fuel operating mode and said liquid-fuel operating mode is selected as a function of inputs comprising at least one of gaseous fuel storage pressure, gaseous fuel mass, liquefied gaseous fuel level, liquefied gaseous fuel volume, liquefied gaseous fuel mass, and gaseous fuel injection pressure.

57. The method of claim 44, further comprising injecting said gaseous fuel after said intake valve closes.

58. The method of claim 44, further comprising starting injection of said gaseous fuel before said intake valve closes.

59. The method of claim 44, wherein injecting said gaseous fuel further comprises:
(i) detecting a predetermined condition during said gaseous-fuel operating mode;
(ii) mathematically defining said gaseous-to-liquid fuel ratio; and
(iii) selectively injecting said liquid fuel periodically during said gaseous-fuel operating mode.

60. The method of claim 59, wherein said predetermined condition is at least one of a lubricate-time threshold, a cool-time threshold, a clean-time threshold, and a liquid-fuel-cycle-time threshold, and said predetermined condition is detected when at least one of said thresholds is met or exceeded.

61. The method of claim 59, wherein selectively injecting said liquid fuel during said gaseous-fuel operating mode further comprises:
measuring at least one of average crank rotational speed, gaseous fuel consumed, average torque, inlet temperature, mass air flow, engine temperature, coolant temperature, and time since said second fuel supply was filled;
whereby said predetermined condition is met when said measurement reaches or exceeds a threshold.

62. The method of claim 44, wherein injecting said liquid fuel further comprises:
(i) detecting a predetermined condition during said liquid-fuel operating mode;
(ii) commanding said gaseous-to-liquid fuel ratio to have a value greater than zero in response to said predetermined condition; and
(iii) selectively injecting said gaseous fuel periodically during said liquid-fuel operating mode.

63. The method of claim 62, wherein said predetermined condition is a threshold level of engine knock.

64. The method of claim 62, wherein said predetermined condition is a threshold level of emissions.

65. The method of claim 44, further comprising;
(e) selecting a dual-fuel operating mode when the quantity of gaseous fuel is below the upper threshold and above a lower threshold and the liquid fuel operating mode when the quantity of gaseous fuel is below the lower threshold, said gaseous-to-liquid fuel ratio being mathematically defined and having a value greater than zero during said dual-fuel operating mode;
(f) injecting said gaseous fuel directly into said combustion chamber during said dual-fuel operating mode; and
(g) injecting said liquid fuel upstream of an intake valve during said dual-fuel operating mode, said liquid fuel injected into an intake charge.

66. The method of claim 65, wherein said dual-fuel operating mode is selected as a function of inputs comprising at least one of a gaseous-fuel storage pressure, a gaseous-fuel injection pressure, a gaseous-fuel storage temperature, a gaseous-fuel mass, a liquefied gaseous-fuel level, and a liquefied gaseous-fuel mass.

67. The method of claim 65, further comprising decreasing said gaseous-to-liquid fuel ratio during said dual-fuel operating mode based on a decrease in at least one of said gaseous-fuel storage pressure and said gaseous fuel injection pressure.

68. The method of claim 65, further comprising selecting said gaseous-to-liquid fuel ratio during said dual-fuel operating mode to maintain emissions below a threshold level.

* * * * *